United States Patent
Shimizu

(10) Patent No.: US 8,755,070 B2
(45) Date of Patent: Jun. 17, 2014

(54) PRINTING APPARATUS, CONTROL METHOD FOR PRINTING APPARATUS, AND PROGRAM, THAT SUPPLIES POWER BASED ON A PREDETERMINED TEMPERATURE

(75) Inventor: Yasushi Shimizu, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 13/160,296

(22) Filed: Jun. 14, 2011

(65) Prior Publication Data

US 2011/0317207 A1    Dec. 29, 2011

(30) Foreign Application Priority Data

Jun. 25, 2010    (JP) .................................. 2010-145333

(51) Int. Cl.
*G06F 3/12*    (2006.01)
(52) U.S. Cl.
USPC ........... 358/1.15; 358/1.14; 358/1.13; 399/82; 399/88; 399/67; 399/69; 713/300; 713/320; 101/484
(58) Field of Classification Search
USPC ............. 358/1.14, 1.15, 1.13; 399/82, 88, 67, 399/69; 713/300, 320; 101/484
See application file for complete search history.

(56) References Cited

U.S. PATENT DOCUMENTS

| | | | |
|---|---|---|---|
| 6,373,585 B1 * | 4/2002 | Mastie et al. | 358/1.15 |
| 2006/0028661 A1 * | 2/2006 | Uruma | 358/1.6 |
| 2006/0083534 A1 | 4/2006 | Ogura | |
| 2006/0224660 A1 * | 10/2006 | Negishi | 709/201 |
| 2009/0316178 A1 * | 12/2009 | Tanaka | 358/1.14 |

FOREIGN PATENT DOCUMENTS

| | | |
|---|---|---|
| CN | 1575449 A | 2/2005 |
| CN | 1731298 A | 2/2006 |
| JP | 10-010955 A | 1/1998 |
| JP | 2003-296068 A | 10/2003 |
| JP | 2006-072972 A | 3/2006 |
| JP | 2007-248764 A | 9/2007 |
| JP | 2008-067299A A | 3/2008 |
| JP | 2008-158194A A | 7/2008 |
| JP | 2009-116818 A | 5/2009 |

* cited by examiner

*Primary Examiner* — Jacky X Zheng

(74) *Attorney, Agent, or Firm* — Canon USA Inc IP Division

(57) ABSTRACT

A printing apparatus includes an input unit configured to input a print job, a print unit configured to perform print processing onto a print medium based on the print job input by the input unit, a receiving unit configured to receive a request for shutting off power supply of the printing apparatus, an execution unit configured to execute processing for shifting to a state where power supply of the print unit can be shut off, in response to the fact that the request has been received by the receiving unit, and a control unit configured to perform control, if a request for shutting off a power supply of the printing apparatus is received by the receiving unit, to prevent the print processing based on the print job from being executed, and on the other hand, to permit execution of processing based on another job different from the print job.

10 Claims, 7 Drawing Sheets

FIG. 6

JOB MANAGEMENT DATA

LIST OF STANDBY JOBS DURING SHUTDOWN

| JOBID | FILE NAME | DATE AND TIME | STATUS |
|---|---|---|---|
| 1001 | 2009_11_17DAILY REPORT.doc | 2009/11/17 21:00 | WAITING FOR PRINT |
| 1002 | xxx CONFERENCE MATERIALS.ppt | 2009/11/17 21:07 | SAVE |
| 1003 | Aa_BbLIST.xls | 2009/11/17 21:25 | SAVE |
| | | | |
| | | | |
| | | | | ated above, to keep...

PRINTING APPARATUS, CONTROL METHOD FOR PRINTING APPARATUS, AND PROGRAM, THAT SUPPLIES POWER BASED ON A PREDETERMINED TEMPERATURE

BACKGROUND OF THE INVENTION

1. Field of the Invention

The present invention relates to a printing apparatus, a control method for the printing apparatus, and a program.

2. Description of the Related Art

In a printing apparatus represented by an electrophotography which pursues a high-image quality, when a power supply is cut off immediately after use of the apparatus, a fan operation for securing an air flow inside the apparatus is also stopped. For this reason, there are problems that heat of a fixing device propagates into a developing device, thereby causing a toner to be deteriorated (or to be firmly fixed), or, substance generated by an electric discharge of a charging device adheres to a photosensitive drum, thereby defective images occur in a first job on the following day.

Therefore, it is necessary to secure the air flow until these influences disappear. As a result, when a user tries to power off after use of the apparatus, there are many processing that require a lot of time of fan control as a processing before power-off. For this reason, an enormous amount of time will be required since a shutdown instruction until an actual power-off.

In addition, there is also a possibility that an error of the apparatus may occur, during the fan control. Even when another power supply is used for a power supply of an apparatus represented by the fan control, it is necessary to energize a power supply of a controller that governs display or control other than the power supply.

Such an energized state is often a state where shutdown processing has been started, and usually there are also many apparatuses that do not receive new jobs, or cancel jobs under execution. As a result, there exist cases where processing of the jobs under execution will go to a waste.

To avoid such problems, saving unprocessed data in a nonvolatile memory at the time of power-off of the apparatus is discussed in Japanese Patent Application Open-Laid No. 2009-116818.

As described above, to keep the printing apparatus in a good condition, a processing time for processing to be executed before power-off (hereinafter, processing before power-off) is required to an certain degree. However, it is possible, even in the meantime, to execute processing in which print of images is not executed. In particular, in a device which performs printing collectively, like a print on demand (POD) center in a business enterprise or a university, it is expected that execution of preparations for print processing for the next day even during shutdown will bring about dramatic improvement of work. From users, it is desired to enhance job execution efficiency by the printing apparatus, while keeping the printing apparatus in a good condition.

SUMMARY OF THE INVENTION

The present invention is directed to providing a mechanism, while keeping a printing apparatus in a good condition, to enhance job execution efficiency by the printing apparatus.

According to an aspect of the present invention, a printing apparatus includes an input unit configured to input a print job, a print unit configured to perform print processing onto a print medium based on the print job input by the input unit, a receiving unit configured to receive a request for shutting off power supply of the printing apparatus, an execution unit configured to execute processing for shifting to a state where power supply of the print unit can be shut off, depending on the fact that the request has been received by the receiving unit, and a control unit configured to perform control, if a request for shutting off a power supply of the printing apparatus is received by the receiving unit, to prevent the print processing based on the print job from being executed, and on the other hand, to permit execution of processing based on another job different from the print job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates one example of a list of standby jobs during shutdown displayed in step S502 in FIG. 5.

DESCRIPTION OF THE EMBODIMENTS

Various exemplary embodiments, features, and aspects of the invention will be described in detail below with reference to the drawings.

Figure 1:
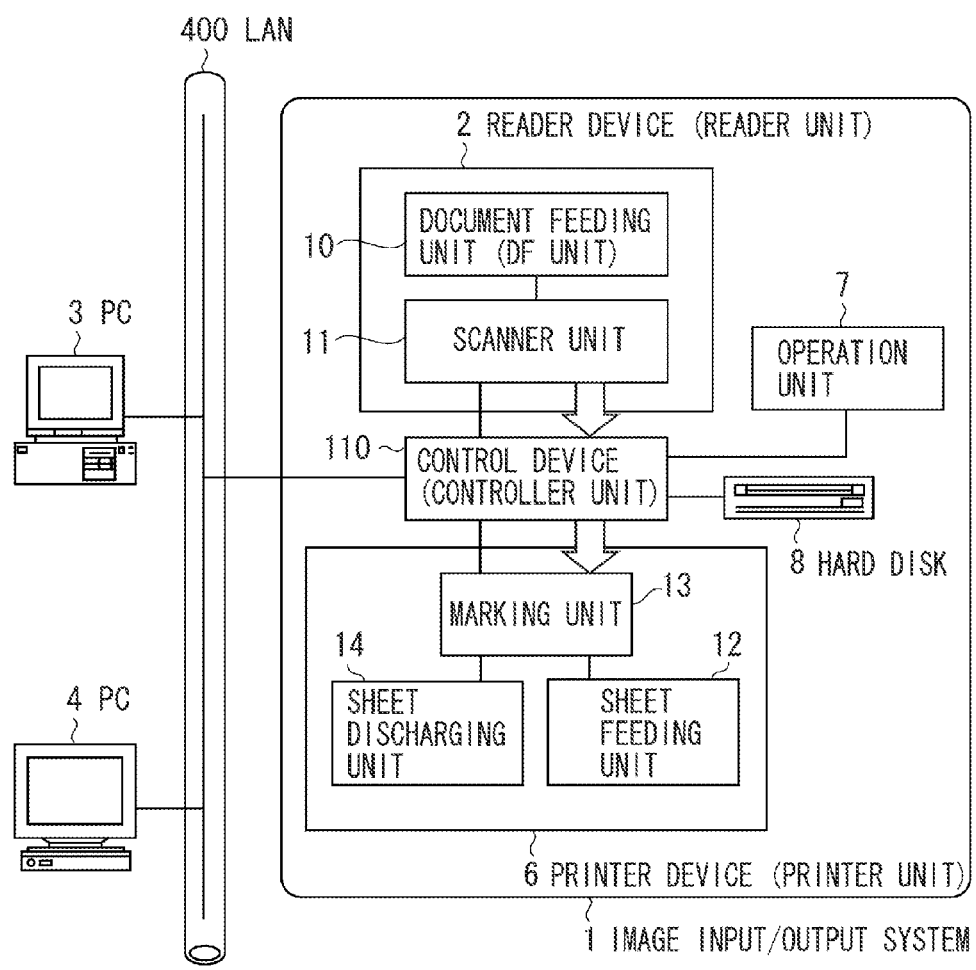
FIG. 1 is a block diagram illustrating one exemplary embodiment of an image input/output system (image forming apparatus) in which a controller unit is mounted as an electronic component according to the present invention.

FIG. 1 is a block diagram illustrating one exemplary embodiment of an image input/output system (printing apparatus) in which a controller unit is mounted as an electronic component according to the present invention. In FIG. 1, the image input/output system 1 is connected to host computers 3 and 4 via a local area network (LAN) 400 such as Ethernet (registered trademark). The image input/output system 1 includes a reader unit (reader device) 2, a printer unit (printer device) 6, an operation unit 7, and a controller unit (control device) 110. The reader unit 2 performs reading out processing of image data. The reader unit 2 includes a document feeding unit 10 that conveys a document paper, and a scanner unit 11 that optically reads out and converts document image into image data as electric signals.

The printer unit 6 is a print unit that performs print processing for printing an image based on the image data on a recording sheet (print medium). The printer unit 6 includes a sheet feeding unit 12 provided with sheet feeding cassettes in plural stages that accommodate the recording sheets, a marking unit 13 that transfers an image (developer image) onto the recording sheet (print medium) and thermally fixes a developer on the recording sheet (on print medium), and a sheet discharging unit 14 that effects sorting processing and staple processing on the printed recording sheets and discharges them to the outside.

The operation unit 7 is provided with a keyboard that performs input/output operation of the image data, and a liquid crystal panel that performs display of the image data and various functions. A hard disk drive (HDD) 8 in which a control program and the image data have been written in advance is attached to the controller unit 110. The controller unit 110 is connected to respective components of the reader unit 2, the printer unit 6 and the operation unit 7, and controls the respective components. The controller unit 110 includes a function block that can realize a scanner function, a printer function, and other functions. The scanner function is a function that converts the image data read out by the reader unit 2 into codes, and transmits the codes to the host computers 3 and 4 via the LAN 400. The printer function is a function that converts code data received via the LAN 400 from the host computers 3 and 4 into image data, and outputs the image data to the printer unit 6.

Figure 2:
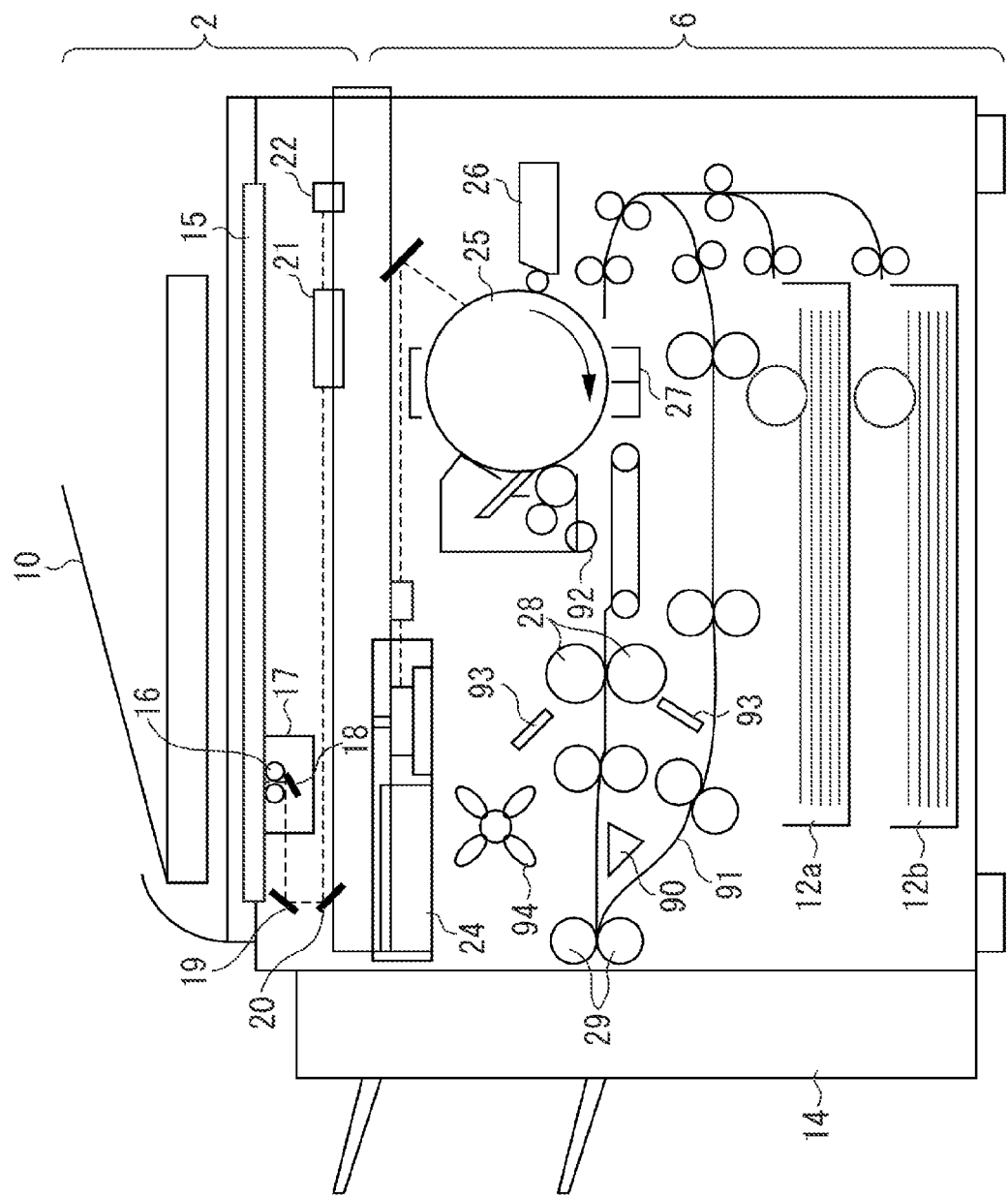
FIG. 2 is a cross-sectional view illustrating a configuration of a reader unit 2 and a printer unit 6.

FIG. 2 is a cross-sectional view illustrating a configuration of the reader unit 2 and the printer unit 6. As illustrated in FIG. 2, the reader unit 2 is placed on the printer unit 6. In the reader unit 2, the document sheets piled on the document feeding unit 10 are fed one by one successively from the top onto a platen glass 15 according to the order of the pile, read out by the scanner unit 11 (FIG. 1), and are discharged from the platen glass 15 to the sheet discharging unit 14.

In the scanner unit 11, when the document sheet is conveyed onto the platen glass, a lamp 16 is lit up, movement of the optical unit 17 is then started, and fixed at a reading position. The optical unit 17 irradiates and scans the conveyed document sheet from underneath. A reflected light from the document sheet is directed to a charge-coupled device (CCD) image sensor (hereinafter, CCD) 22, via a plurality of mirrors 18 to 20 and a lens 21, and the scanned document image is read out by the CCD 22. The image data read out by the CCD 22, after having been subjected to a predetermined processing, is transferred to the controller unit 110 (omitted in FIG. 2).

The scanner unit 11 similarly lights up the lamp 16, onto the document placed on the platen glass 15, and after that, can also read out the scanned document image by the CCD 22, by starting movement of the optical unit 17, irradiating and scanning the document sheet from underneath.

The image data from the reader unit 2 sent out according to the above-described procedure is sent out to the controller unit 110 via the scanner connector 56. Next, in the printer unit 6, a laser beam corresponding to the image data output from the controller unit 110 is emitted from a laser light emitting unit 24 driven by a laser driver 23. By scanning the photosensitive drum 25 of the marking unit 13 (FIG. 1) with the laser beam, an electrostatic latent image according to the laser beam is formed on the photosensitive drum 25. The developing device 26 causes the developer to adhere to the electrostatic latent image portion on the photosensitive drum 25, whereby forming a developer image.

On the other hand, the recording sheet is fed from the sheet feeding unit 12 (sheet feeding cassettes 12a and 12b) at the timing in synchronism with irradiation start of the laser beam, and is conveyed to the transfer unit 27. The transfer unit 27 transfers the developer, which adheres to the photosensitive drum 25, onto the conveyed recording sheet. The recording sheet onto which the developer image has been transferred is conveyed to a fixing unit 28. The fixing unit 28 performs heating/pressing processing onto the conveyed recording sheet, whereby causing the developer image to be fixed onto the recording sheet. Temperatures of the fixing unit 28 can be measured by a temperature sensor 93 composed of a thermistor or the like. It is possible to secure air flow inside the printer unit 6 by driving a fan 94, to suppress temperature rise of the fixing unit 28, and to suppress temperature rise inside the printer unit 6.

For single-sided print, the printer unit 6 conveys the recording sheet, which has been conveyed passing through the fixing unit 28, to the sheet discharge roller 29, and discharges it directly to the sheet discharging unit 14 by the sheet discharge roller 29. The sheet discharging unit 14 performs sorting of the recording sheets by bundling the discharged recording sheets, and performs staple processing and punch processing and the like of the sorted recording sheets.

For two-sided print, the printer unit 6, after conveying the recording sheet to the sheet discharge roller 29, reverses a rotational direction of the sheet discharge roller 29, and leads the recording sheet to a sheet refeed conveyance path 91 by a flapper 90. The recording sheet led by the sheet refeed conveyance path 91 is conveyed to the transfer unit 27 in the similar manner to the foregoing.

Figure 3:
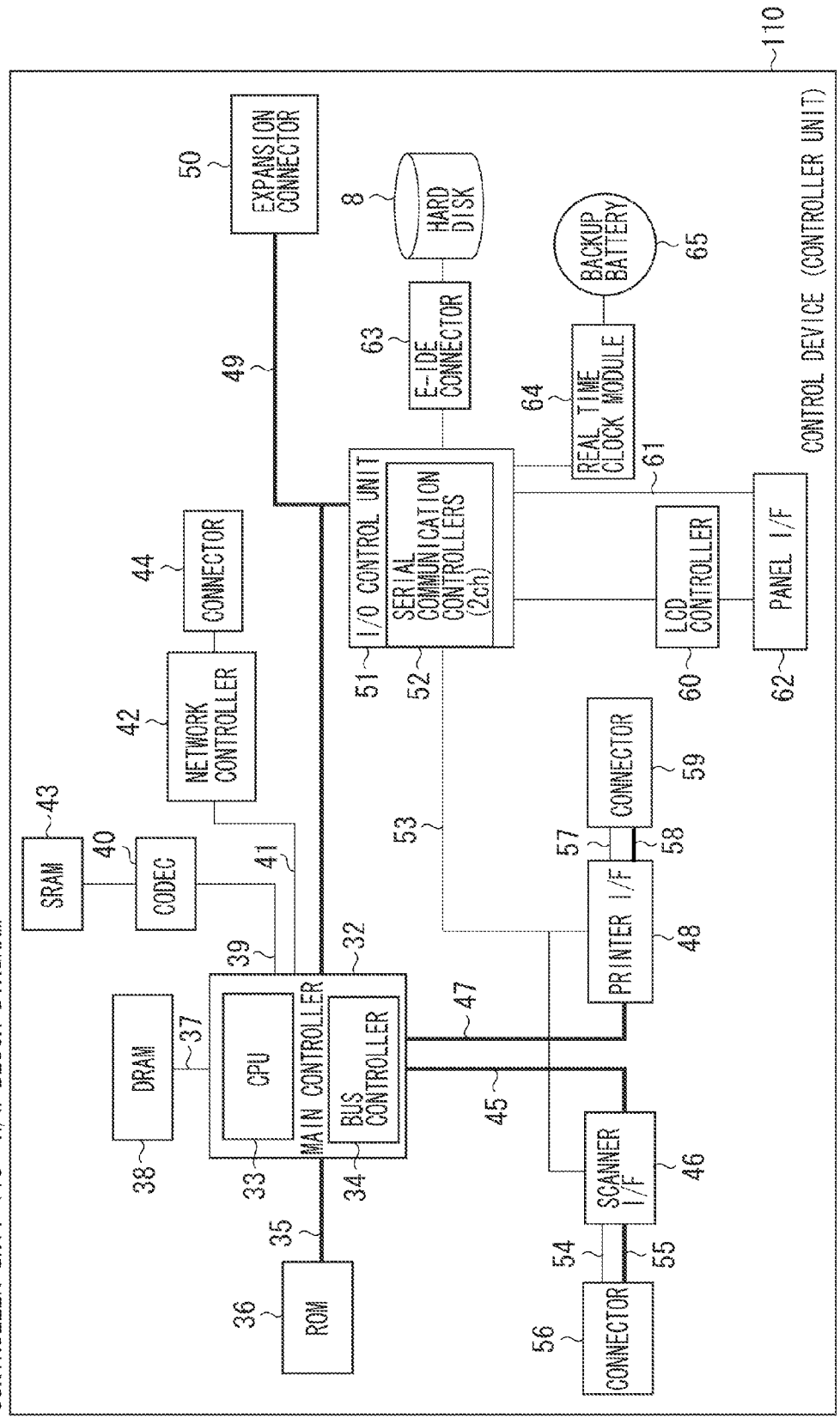
FIG. 3 is a block diagram illustrating the details of a controller unit 110.

FIG. 3 is a block diagram illustrating the details of the controller unit 110. In FIG. 3, a main controller 32 includes CPU 33 and bus controller 34, and functional block including various controller circuits described below. Further, the main controller 32 is connected to a read-only memory (ROM) 36 via a ROM I/F 35, connected to a dynamic random-access memory (DRAM) 38 via a DRAM I/F 37, and connected to a Codec 40 via a Codec I/F 39. In addition, the main controller 32 is connected to a network controller 42 via a network I/F 41.

In the ROM 36, various control programs and operation data executed by the CPU 33 of the main controller 32 are computer-readably stored. The DRAM 38 is used as a work area for the CPU 33 to operate or an area for accumulating the image data. The Codec 40 compresses raster image data accumulated in the DRAM 38 by well-known compression schemes such as modified huffman (MH)/modified read (MR)/modified modified read (MMR)/joint bi-lebel image experts group (JBIG), and decompresses the compressed data into raster images. In addition, a static random access memory (SRAM) 43 is connected to the Codec 40, and the SRAM 43 is used as a temporary work area of the Codec 40. The network controller 42 performs a predetermined control operation between the LAN 400 and the network controller 42 via the connector 44.

The main controller 32 is connected to a scanner I/F 46 via the scanner bus 45, and is connected to a printer I/F 48 via a printer bus 47. Furthermore, the main controller 32 is connected to an expansion connector 50 for connecting an expansion board and an input/output control unit (I/O control unit) 51 via a general-purpose high-speed bus 49 such as peripheral components interconnect (PCI) bus.

The I/O control unit 51 is equipped with 2 channels of an asynchronous serial communication controller 52 for transmitting and receiving control commands between the reader unit 2 and the printer unit 6. The serial communication controller 52 is connected to the scanner I/F 46 and the printer I/F 48 via the I/O bus 53.

The scanner I/F 46 is connected to a scanner connector 56 via a first asynchronous serial I/F 54 and a first video I/F 55, and furthermore the scanner connector 56 is connected to the scanner unit 11 of the reader unit 2. Then, the scanner I/F 46 performs desired binarization processing, and variable magnification processing in a main-scanning direction and/or a sub-scanning direction, on the image data received from the scanner unit 11. Furthermore, the scanner I/F 46 generates a control signal according to a video signal sent from the scanner unit 11, and transfers it to the main controller 32 via the scanner bus 45.

The printer I/F 48 is connected to a printer connector 59, via a second asynchronous serial I/F 57 and a second video I/F 58, and furthermore the printer connector 59 is connected to the marking unit 13 of the printer unit 6. Then, the printer I/F 48 effects smoothing processing on the image data output from the main controller 32, and outputs the image data to the marking unit 13. In addition, the printer I/F 48 outputs a control signal generated, according to the video signal sent from the marking unit 13, to a printer bus 47.

The CPU 33 is a processor that operates based on a control program read via the ROM I/F 35 from the ROM 36, interprets page description language (PDL) data received from, for example, the host computers 3 and 4, and performs rasterization processing on the raster image data.

The bus controller 34 is used to control data transfer which is input and/or output from external device connected to the scanner I/F 46, the printer I/F 48, and the expansion connector 50, and performs control of arbitration at the time of bus competition or direct memory access (DMA) data transfer. For example, data transfer between the above-described DRAM 38 and the Codec 40, or data transfer from the scanner unit 11 to the DRAM 38, and data transfer from the DRAM 38 to the marking unit 13 are controlled by the bus controller 34, and are DMA transferred.

The I/O control unit 51 is connected to a panel I/F 62 via a liquid crystal display (LCD) controller 60 and a key input I/F 61. The panel I/F 62 is connected to the operation unit 7. Further, the I/O control unit 51 is connected to a nonvolatile memory (not illustrated), the HDD 8 via an enhanced-integrated drive electronics (E-IDE) connector 63, and to a real time clock module 64 that updates/saves dates and times to be managed within the device. The real time clock module 64 is connected to a backup battery 65, and is backed up by the backup battery 65.

Figure 4:
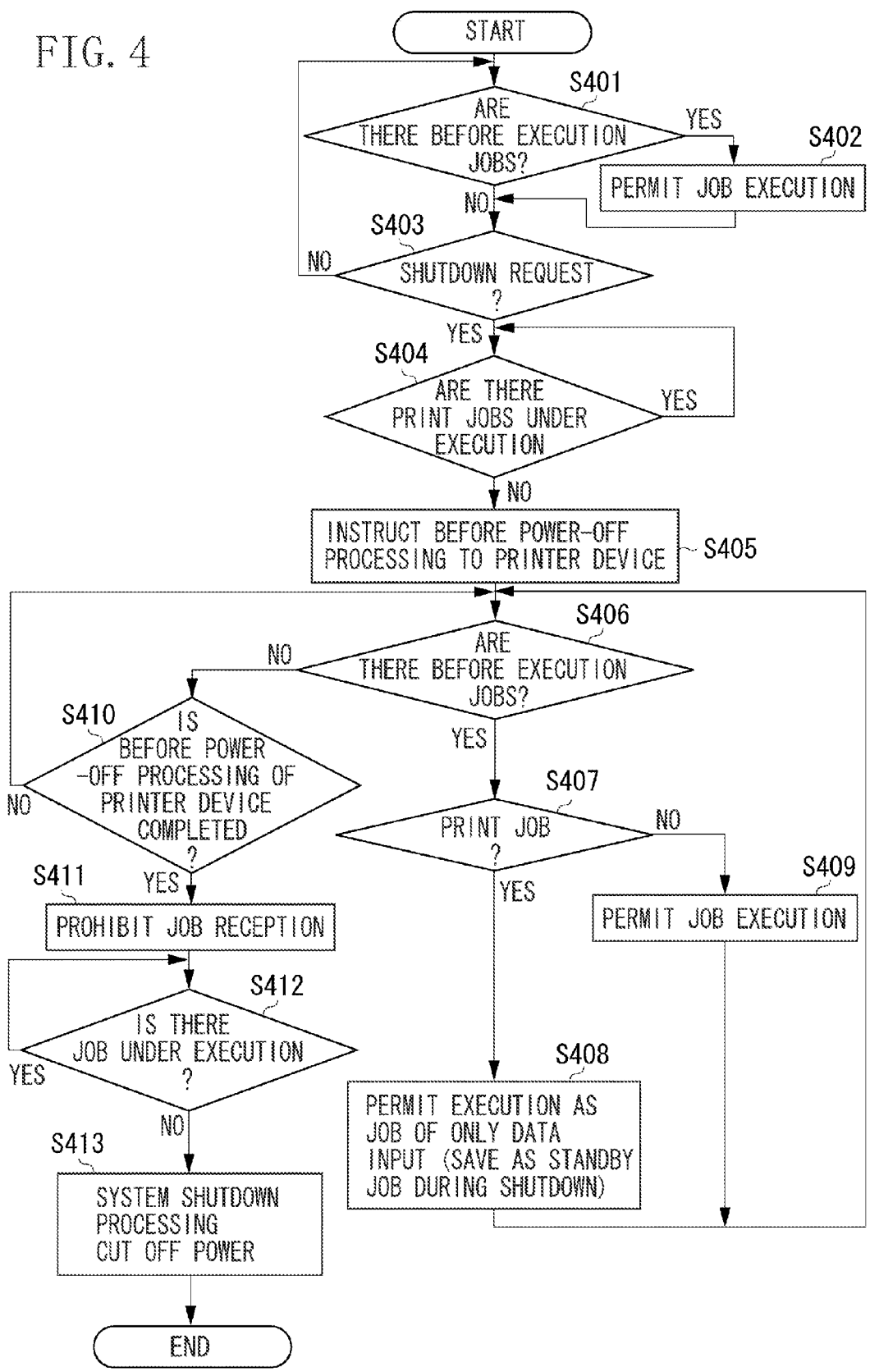
FIG. 4 is a flowchart illustrating one example of program control that performs permit/non-permit of execution of jobs and shutdown executed by a central processing unit (CPU) 33.

Hereinbelow, operation of a program executed by the CPU 33 of the main controller 32 will be described along the flowcharts in FIG. 4 and FIG. 5. FIG. 4 is a flowchart illustrating one example of program control for performing permit/non-permit of execution of jobs executed by the CPU 33 and shutdown control. The flowcharts are realized by causing the CPU 33 to read out and execute a program computer-readably stored in the ROM 36, the HDD 8 or other recording media.

The CPU 33 can transfer print data from the PC 3 or the PC 4, or image data input from the scanner unit 11 to the marking unit 13 and can print them. Also, the CPU 33 can save data scanned according to instruction of the operation unit 7 in the HDD 8, and the saved data can be sent to the PC 3 or the PC 4 via the LAN 400.

In step S401, the image input/output system 1 is in a standby state (job executable state), and the CPU 33 checks whether job request is made to the apparatus. If there are jobs before execution (YES in step S401), then in step S402, the CPU 33 permits execution of the jobs. In this state, since the CPU 33 has not performed shutdown processing, the CPU 33 permits execution of all jobs including print jobs requested by the image input/output system 1, and advances the processing to step S403.

Although there is possibly a case where execution of jobs is not permitted due to other factors such as failure other than shutdown processing or access limitation to a system, description thereof will be omitted since this has no direct effect on the present invention. Further, receiving processing itself of the jobs is performed by a separate program executed in parallel by the CPU 33, and job receiving is performed by recording a type of job, request source of job and the like on the HDD 8. Hereinafter, it is possible to continue job receiving processing, until the CPU 33 prohibits job receiving in step S411.

In the above-described step S401, if the CPU 33 determines that there is no job before execution (NO in step S401), the CPU 33 shifts the processing to step S403. In step S403, the CPU 33 checks whether there is shutdown request. If the power switch unit 70 illustrated in FIG. 7 described below is switched from ON to OFF by a user (operator) of the image input/output system 1, these pieces of information are notified to the CPU 33. Upon receiving the notification, the CPU 33 determines that there has been shutdown request (request for shutting off power supply of the apparatus). Further by performing instruction to cut off power supply from the operation unit 7, or the PC 3 or the PC 4 on the network, the power switch unit 70 illustrated in FIG. 7 described below can be switched from ON to OFF, the CPU33 may determine that there has been shutdown request.

In the above-described step S403, if the CPU 33 determines that there is no shutdown request (NO in step S403), the CPU 33 returns the processing to step S401. On the other hand, in step S403, the CPU 33 determines that there is shutdown request (YES in step S403), the CPU 33 shifts the processing to step S404. In step S404, the CPU 33 checks whether there are print jobs under execution (jobs performed by using the printer unit 6 in FIG. 4). In FIG. 4, "print job" means "job performed by using the printer unit 6". Then, if the CPU 33 determines that there is no print job under execution (NO in step S404), the CPU 33 advances the processing to step S405. On the other hand, in the above-described step S404, if the CPU 33 determines that there are print jobs under execution (YES in step S404), the CPU 33 stands by until the jobs under execution are completed, and shifts the processing to step S405, when the print jobs under execution are completed.

In step S405, the CPU 33 instructs the printer unit 6 to execute processing before power-off via the printer I/F 48, and shifts the processing to step S406. In step S406, the CPU 33 checks whether there are jobs before execution, which are requested for execution by the image input/output system 1. Then, if the CPU 33 determines that there are jobs before execution (YES in step S406), the CPU 33 shifts the processing to step S407. In step S407, the CPU 33 checks whether the jobs before execution are print jobs.

Then, if the CPU 33 determines that the jobs before execution are not print jobs (NO in step S407), the CPU 33 determines that jobs other than the print jobs are executable. In step S409, the CPU 33 permits execution of the jobs, and returns the processing to step S406. "Jobs other than print jobs" are jobs performed without using the printer unit 6, and include, for example, processing of scanning documents by using the reader unit 2 and saving them in the HDD 8, and processing of transferring the images saved in the HDD 8 to the PC 3 or the PC 4. Also, jobs other than print jobs include processing of saving data from the PC 3 or the PC 4 in the HDD 8, without executing the print processing.

On the other hand, if the CPU 33 determines that the jobs before execution are print jobs (YES in step S407), the CPU 33 shifts the processing to step S408. In step S408, the CPU 33 changes operation of the job, from the print job to a job for saving the image data in the HDD 8 (i.e., job performed without using the printer unit 6) so that execution of print processing can be carried out at the time of power-on next time without executing print processing, and permits the execution thereof. Furthermore, when the above-described image data is saved in the HDD 8, the CPU 33 saves information that the above-described image data has been registered as the print standby jobs during shutdown as an attribute of job, in the HDD 8 in association with the above-described data. "Attribute of job" is a parameter which the job has, and is saved in the HDD 8 in association with the job. If the above-described print job is expressed using a page description language, the CPU 33 changes an operation of the job, to a job for saving data obtained by rasterizing the print job into bitmap data (image data) immediately before the print in the HDD 8, and permits the execution.

When the processing in the above-described step S408 is completed, the CPU 33 returns the processing to step S406. On the other hand, in step S406, the CPU 33 determines that there is no job before execution which is requested for execution by the image input/output system 1 (NO in step S406), the CPU 33 shifts the processing to step S410.

In step S410, the CPU 33 checks whether processing before power-off of the printer unit 6 via the printer I/F 48 has been completed. Here, the processing before power-off of the printer unit 6 will be described. The processing before power-off is processing for shifting the printer unit 6 to a state in which power supply can be shut off. In the processing before power-off, the printer unit 6 checks mainly a state of the marking unit 13. The printer unit 6 checks whether a temperature of the fixing unit 28 falls below a predetermined temperature, based on temperatures measured by the temperature sensor 93 illustrated in FIG. 2. Then, the printer unit 6 checks that the temperature of the fixing unit 28 falls below the predetermined temperature, and subsequently notifies that power supply of the printer device can be normally cut off to the CPU 33 via the printer I/F 48. If the power supply is cut off in a state where the temperature of the fixing unit 28 has not dropped sufficiently, a temperature of the developer rises, and there is a possibility that deterioration may occur. The printer unit 6, upon determining that the temperature of the fixing unit 28 has dropped sufficiently (has fallen below the predetermined temperature) by the temperature sensor 93, notifies that the power supply of the printer device can be normally cut off to the CPU 33 via the printer I/F 48. The printer unit 6, which is not provided with the temperature sensor 93, should notify that the power supply of the printer device can be normally cut off to the CPU 33, for example, waiting for an elapse of time during which it is assumed that a temperature of the fixing unit 28 sufficiently drops (falls below the predetermined temperature).

Then, in step S410, if the CPU 33 determines that processing before power-off of the printer unit 6 is not completed, and the power supply of the printer device cannot be normally cut off (NO in step S410), the CPU 33 returns the processing to step S406.

On the other hand, in step S410, if the CPU 33 determines that the processing before power-off of the printer unit 6 is completed, and the power supply of the printer device can be normally cut off (YES in step S410), the CPU 33 shifts the processing to step S411, and from then on, prohibits job receiving.

Then, in step S412, the CPU 33 determines whether there are jobs under execution. If the CPU 33 determines that there is no job under execution (NO in step S412), the CPU 33 advances the processing to step S413. On the other hand, in step S412, if the CPU 33 determines that there are jobs under execution (YES in step S412), the CPU 33 stands by until the jobs under execution disappear. If the jobs under execution disappear, the CPU 33 advances the processing to step S413.

In step S413, the CPU 33 performs system shutdown processing such as compatibility check of the HDD of system, and turns the power supply of the system off (cutoff), and terminates the processing.

As described above, even when the image input/output system 1 (printing apparatus) is currently performing shutdown, operation availability of the image input/output system 1 can be enhanced by efficiently executing jobs depending on job type (execute jobs without using the printer unit 6) during the processing before power-off.

Hereinbefore, in the flowchart in FIG. 4, processing of jobs during shutdown of the image input/output system 1 has been described. Next, when the image input/output system 1, which has been shutdown in the processing in FIG. 4, is activated again, operation to execute standby jobs during print on which print processing has not been implemented in FIG. 4, will be described, in the flowchart in FIG. 5.

Figure 5:
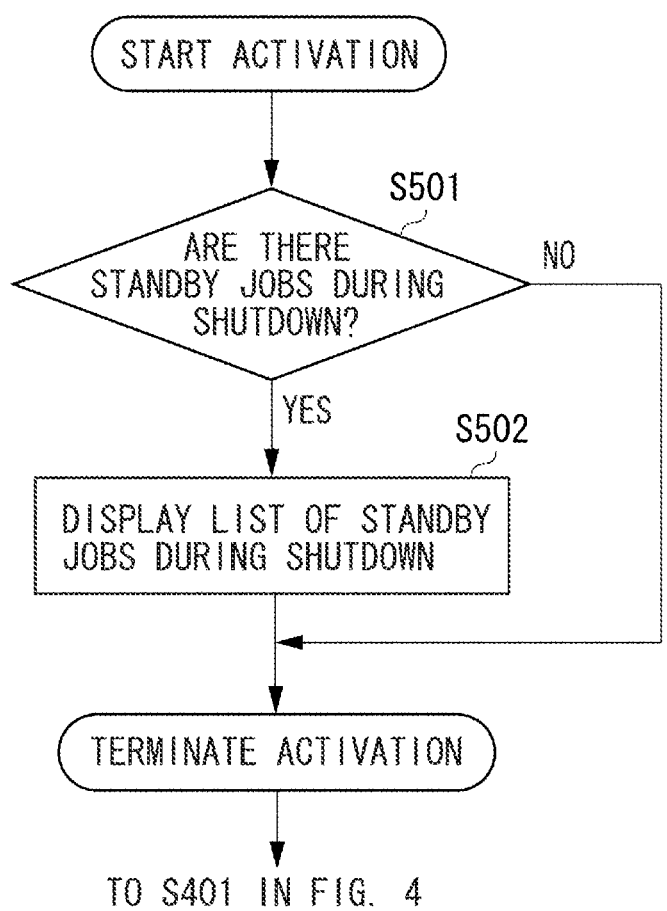
FIG. 5 is a flowchart illustrating one example of program control that performs processing at the time of startup executed by the CPU 33.

FIG. 5 is a flowchart illustrating one example of program control which performs processing at the time of activation executed by the CPU 33. The flowchart is realized by causing the CPU 33 to read out and execute a program computer-readably stored in the ROM 36, the HDD 8 or other recording media.

The standby jobs during shutdown saved in the HDD 8 in step S404 in FIG. 4, is saved in the HDD 8, in association with the image data, taking information that they have been registered as print standby jobs during shutdown as an attribute of job. After the processing before power-off of the printer unit 6 is completed, and finally the power supply is cut off, the image input/output system 1 is activated next time. At this time, the CPU 33 executes the processing in step S501 in FIG. 5.

First, in step S501, the CPU 33 checks whether there are standby jobs during shutdown saved in step S408 in FIG. 4, in the HDD 8. Then, if the CPU 33 determines that there is no standby job during shutdown in the HDD 8 (NO in step S501), the CPU 33 terminates activation processing in FIG. 5, and shifts processing to step S401 in FIG. 4.

On the other hand, if the CPU 33 determines that there are standby jobs during shutdown saved in the HDD 8 (YES in step S501), the CPU 33 advances the processing to step S502. In step S502, the CPU 33 creates a list of the standby jobs during shutdown saved in the HDD 8, and displays the list on the display unit of the operation unit 7, as illustrated in FIG. 6. FIG. 6 illustrates one example of a list of the standby jobs during shutdown to be displayed in step S502 in FIG. 5. When display of the list of the jobs in the above-described step S502 is completed, the CPU33 terminates the activation processing in FIG. 5, and shifts the processing to step S401 in FIG. 4. More specifically, the CPU 33 manages permit/non-permit of execution of the standby jobs during shutdown saved in the HDD 8, by a program which implements permit/non-permit of execution of jobs and shutdown control illustrated in FIG. 4.

In step S401 in FIG. 4 the CPU 33 checks whether there are jobs before execution. The CPU 33 checks the jobs saved in the HDD 8 at the time of checking, and performs permit of execution of the jobs in step S402 in FIG. 4. Accordingly, jobs performed by using the printer unit 6 like the standby jobs during shutdown saved in the HDD 8, will be subjected to print execution successively, as and when the printer unit 6 becomes capable of print execution.

By executing the flow as described above, the image input/output system 1 becomes capable of effectively executing jobs during a time length until the printer unit 6 can make preparation for cutting off the power supply. In a state where the preparations for power-off of the printer unit 6 are completed, the printer unit 6 becomes capable of promptly cutting off the power supply. Furthermore, by displaying a list of the jobs which could not be printed during the preceding shutdown at the time of power-on, it becomes possible for the user to promptly check job status at the time of power-on. Furthermore, after re-activation of the image input/output system 1, the image input/output system 1 can execute promptly standby jobs during shutdown saved during a time length until the above-described printer unit 6 can make preparations for cutting off the power supply.

Figure 7:
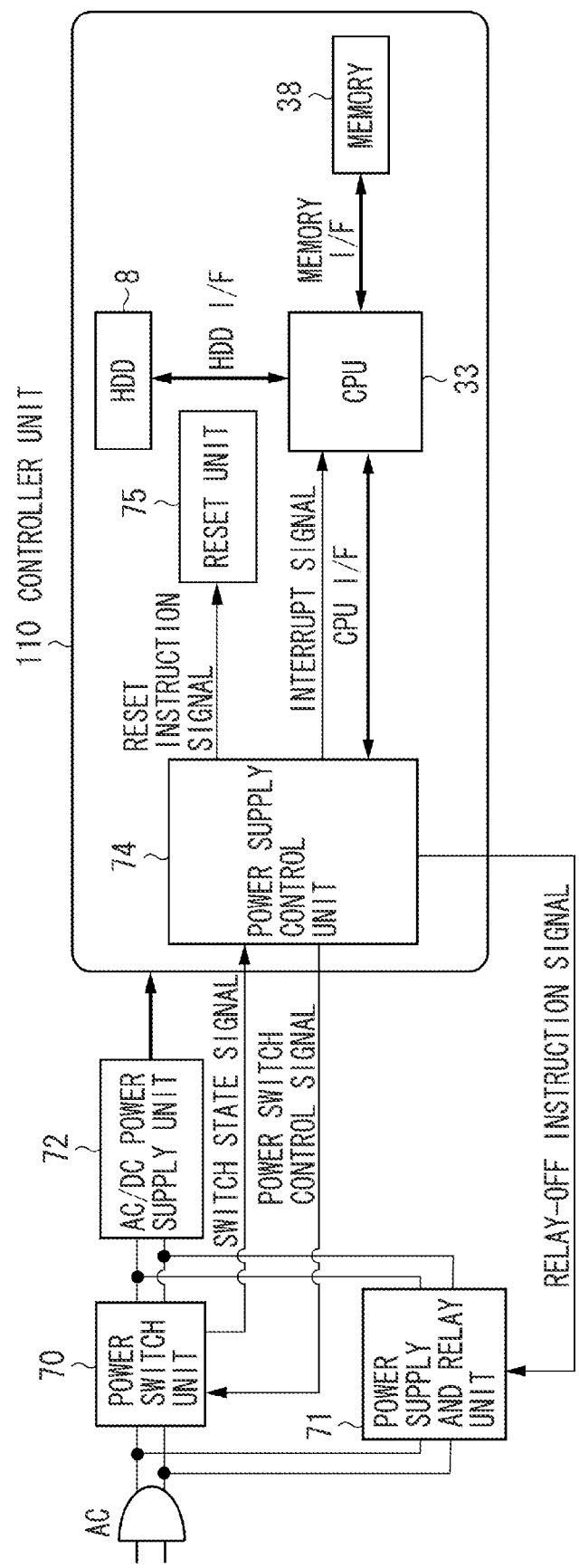
FIG. 7 is a block diagram illustrating a power supply configuration example of an image input/output system 1.

Finally, power supply configuration example of the image input/output system 1 will be described with reference to FIG. 7. FIG. 7 is a block diagram illustrating power supply configuration example of the image input/output system 1. The power supply of the image input/output system 1 employs an automatic shutdown control scheme, and the power switch unit 70 has a solenoid switch which can electrically turn a switch off, and has a function of notifying a status of the switch. The power supply control unit 74 is a control unit that detects a switch status of the power switch unit 70, and issues instruction of shutdown processing or reset instruction or instruction of power-off or the like.

An AC/DC power supply unit 72 is a power supply that converts AC power supply into DC power supply for which the controller unit 110 or the like makes a request. A relay unit 71 is an electric relay arranged in parallel with the power switch unit 70, so that AC power supply from the outside can be supplied to the AC/DC power supply unit 72, even when the power switch unit 70 is powered off.

The AC/DC power supply unit 72 is a power supply for not only the controller unit 110 but also the entire image input/output system 1, and the CPU 33 executes shutdown processing or reset according to instructions from the power supply control unit 74, and can perform control of the entire image input/output system 1.

A reset unit 75 is a hardware reset that performs hardware reset of the entire controller unit 110, in response to reset instructions from the power supply control unit 74, and executes re-activation of a system. The power switch unit 70 is a switch which the user uses when turn off/on of the system is executed.

Hereinbelow, an operation if the user desires power-off of the system will be described. If the power switch unit 70 is switched from ON to OFF, an interrupt control unit incorporated into the power supply control unit 74 asserts an interrupt signal to the CPU 33, and notifies that power switch has been turned OFF to the CPU 33. The CPU 33 which is currently executing control software illustrated in FIG. 4, upon receiving power switch OFF notification, starts shutdown processing according to the control software illustrated in FIG. 4. Specifically, the CPU 33 determines that there has been shutdown request in step S403 in FIG. 4, and executes the processing in steps S404 to S413. Then, the CPU 33, which is currently executing the control software in FIG. 4, notifies a completion of shutdown processing to a relay control unit in the power supply control unit 74, when shutdown processing such as the HDD 8 is completed. The relay control unit in the power supply control unit 74, upon receiving shutdown completion notification, sets the relay unit 71 to OFF via a relay-off signal. Through such a series of processing, both the power switch unit 70 and the relay unit 71 become OFF-state, and power-off of the image input/output system 1 is completed.

By executing the flow as described above, the image input/output system 1 can effectively execute jobs during a time length until the printer unit 6 can make preparations for power-off (during a time length until processing before power-off of the printer unit 6 is completed). Also, it becomes possible to promptly cut off the power supply, in a state where the power-off preparations of the printer unit 6 is completed (when the processing before power-off of the printer unit 6 is completed).

Structures of the various types of data described above and contents thereof are not limited to this, and it is needless to say that the present invention is composed of various structures and contents, depending on intended uses and purposes. Hereinabove, one exemplary embodiment has been illustrated, but the present invention can take embodiments as, for example, a system, an apparatus, a method, a program or a storage medium. More specifically, the present invention may be applied to a system composed of a plurality of devices, or may be applied to an apparatus composed of single device.

Further, configurations combined with respective exemplary embodiments described above are all included in the present invention.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-145333 filed Jun. 25, 2010, which is hereby incorporated by reference herein in its entirety.

What is claimed is:

1. A printing apparatus comprising:
an input unit configured to input a print job and a non-print job;
a print unit configured to perform print processing onto a print medium based on the print job input by the input unit, wherein the print unit includes a fixing unit configured to thermally fix a developer on the print medium;
a receiving unit configured to receive a request for shutting off power supply of the printing apparatus;
a judgment unit configured to judge whether a temperature of the fixing unit falls below a predetermined temperature or not, after the request is received by the receiving unit;
an execution unit configured to execute shutting off power supply of the printing apparatus, in a case that the judgment unit judges that the temperature of the fixing unit falls below the predetermined temperature;
wherein the input unit can input the print job and the non-print job, in a period between when the request is received by the receiving unit and when the judgment unit judges that the temperature of the fixing unit falls below the predetermined temperature, and a control unit configured to perform control, in a case that a job before execution exists in the period, if the job before execution is the print job, to prevent the print processing based on the print job from being executed, and on the other hand, if the job before execution is the non-print job, to permit execution of processing based on the non-print job.

2. The printing apparatus according to claim 1, wherein the control unit, in a case that the judgment unit judges that the temperature of the fixing unit falls below the predetermined temperature, performs control to prevent input of a print job from being performed by the input unit.

3. The printing apparatus according to claim 1, wherein the execution unit, after all jobs under execution are completed, performs control to shut off power supply of the printing apparatus.

4. The printing apparatus according to claim 1, further comprising:
a storage unit configured to store data,
wherein the control unit, if a request for shutting off power supply of the printing apparatus is received by the receiving unit, performs control to register the print job on the storage unit as a standby job, to change the standby job to a job performed without using the print unit, and to permit execution of the changed job.

5. The printing apparatus according to claim 4, wherein, if the print job is a job which includes data described using a page description language, the control unit stores image data obtained by rasterizing the data described using the page description language in the storage unit as a standby job.

6. The printing apparatus according to claim 4, wherein the control unit, if the standby job is stored in the storage unit when the printing apparatus is activated, permits execution of the standby job.

7. The printing apparatus according to claim 6, wherein the control unit, if the standby job is stored in the storage unit when the printing apparatus is activated, displays the standby jobs on a display unit.

8. The printing apparatus according to claim 1, wherein the receiving unit receives a request for shutting off the power supply of the printing apparatus from an operator of the printing apparatus.

9. A control method for a printing apparatus comprising:
inputting a print job and a non-print job;
performing print processing onto a print medium based on the print job input by an input unit, wherein the print unit includes a fixing unit configured to thermally fix a developer on the print medium;
receiving a request for shutting off the power supply of the printing apparatus;
judging whether a temperature of the fixing unit falls below a predetermined temperature or not, after the request is received;
executing shutting off power supply of the printing apparatus, in a case that judges that the temperature of the fixing unit falls below the predetermined temperature;
wherein the print job and the non-print job can be input, in a period between when the request is received and when the judgment unit judges that the temperature of the fixing unit falls below the predetermined temperature, and
performing control, in a case that a job before execution exists in the period, if the job before execution is the print job, to prevent the print processing based on the print job from being executed, and on the other hand, if the job before execution is the non-print job, to permit execution of processing based on the non-print job.

10. A non-transitory computer-readable storage medium storing a control program for causing a computer to perform a method of controlling a printing apparatus connected to an external device, the printing apparatus comprising:
an input unit configured to input a print job and a non-print job;
a print unit configured to perform print processing onto a print medium based on the print job input by the input unit, wherein the print unit includes a fixing unit configured to thermally fix a developer on the print medium;
a receiving unit configured to receive a request for shutting off power supply of the printing apparatus;
a judgment unit configured to judge whether a temperature of the fixing unit falls below a predetermined temperature or not, after the request is received by the receiving unit;
an execution unit configured to execute shutting off power supply of the printing apparatus, in a case that the judgment unit judges that the temperature of the fixing unit falls below the predetermined temperature;
wherein the input unit can input the print job and the non-print job, in a period between when the request is received by the receiving unit and when the judgment unit judges that the temperature of the fixing unit falls below the predetermined temperature, and
a control unit configured to perform control, in a case that a job before execution exists in the period, if the job before execution is the print job, to prevent the print processing based on the print job from being executed, and on the other hand, if the job before execution is the non-print job, to permit execution of processing based on the non-print job.

* * * * *